United States Patent
Bentley (10) Patent No.: US 7,593,511 B2
(45) Date of Patent: Sep. 22, 2009

(54) METHOD FOR TRAINING LINE DRIVERS IN A COMMUNICATION SYSTEM

(75) Inventor: Ronald Bentley, Santa Rosa, CA (US)

(73) Assignee: Alcatel Lucent, Paris (FR)

( * ) Notice: Subject to any disclaimer, the term of this patent is extended or adjusted under 35 U.S.C. 154(b) by 744 days.

(21) Appl. No.: 11/365,386

(22) Filed: Mar. 1, 2006

(65) Prior Publication Data

US 2006/0146986 A1  Jul. 6, 2006

Related U.S. Application Data (63) Continuation of application No. 10/042,563, filed on Nov. 19, 2001, now abandoned.

(51) Int. Cl.
  *H04M 1/24* (2006.01)
  *H04M 3/08* (2006.01)
  *H04M 3/22* (2006.01)
(52) U.S. Cl. ............ 379/9.06; 379/15.01; 379/22.02; 379/26.01; 379/27.01; 379/32.04; 375/222; 375/225; 370/252
(58) Field of Classification Search ......... 379/1.01, 379/1.03, 1.04, 9, 9.06, 12, 15.01, 22, 22.02, 379/24, 26.01, 27.01, 28, 29.01, 29.08, 32.04; 375/219, 222, 224, 225, 227, 285, 377; 370/252
See application file for complete search history.

(56) References Cited

U.S. PATENT DOCUMENTS

| | | | | |
|---|---|---|---|---|
| 4,987,569 A | * | 1/1991 | Ling et al. | 370/292 |
| 5,048,054 A | * | 9/1991 | Eyuboglu et al. | 375/222 |
| 5,214,637 A | * | 5/1993 | Sridhar et al. | 370/286 |
| 5,533,049 A | * | 7/1996 | Lin | 375/222 |
| 5,715,277 A | * | 2/1998 | Goodson et al. | 375/222 |
| 5,802,446 A | * | 9/1998 | Giorgi et al. | 455/69 |
| 5,870,429 A | * | 2/1999 | Moran et al. | 375/222 |

\* cited by examiner

*Primary Examiner*—Binh K Tieu (57) ABSTRACT

A method for training line drivers in a communication system; each driver coupled with at least one communication line configured for communicating with subscriber equipment using at least one tone-set; includes the steps of: (a) selecting a test driver; (b) selecting a test line coupled with the test driver; (c) establishing synchrony with subscriber equipment on the test line; (d) applying a test signal to the test line using a selected tone-set; (e) determining noise on the test line; (f) evaluating whether noise on the test line plus a noise margin is within a predetermined range; (g) when noise is acceptable, designating the selected tone-set for operational employment; (h) repeating steps (b)-(g) until sufficient lines are evaluated for the test driver; and (i) repeating steps (a)-(h) until sufficient drivers are evaluated.

13 Claims, 3 Drawing Sheets

FIG. 3

METHOD FOR TRAINING LINE DRIVERS IN A COMMUNICATION SYSTEM

This application is a continuation of application Ser. No. 10/042,563 filed Nov. 19, 2001, now abandoned entitled "Method for Training Line Drivers in a Communication System" by Ronald Bentley.

BACKGROUND OF THE INVENTION

The present invention is directed to communication distribution networks, and especially to communication loop frequency utilization in such networks.

During setting up, or "training" line cards in a channel bank for distributing operating frequencies among communication loops coupled with the channel bank, respective line drivers and their coupled communication lines are traditionally addressed in a serial fashion. That is, once a given line is trained, a second line is trained and so on. Each time a line is trained it involves an allocation of a plurality of tone-sets, or frequency-sets, used by the particular line card in communicating with subscriber equipment (also known as Customer Provided Equipment or Customer Premises Equipment—CPE). Line training involves establishing synchrony with CPE (customer premises equipment or customer provided equipment) at the distal end of the line from the central office, and applying an algorithm or other test to achieve an acceptable data rate under a given set of criteria. Certain tones may not be used by the system for a particular line if the signal-to-noise ratio (SNR) is unacceptably low for them. To remedy an unacceptably low SNR, a system may, for example, assign fewer bits to a particular tone.

Each successive training process accounts for noise present on the line being trained at the time the training is carried out. As more lines are added to a channel bank, more noise is present. This occurs because there is necessarily progressively more cross talk among lines as lines are added. Additional noise is also present because adding more lines also adds more noise sources to the system, for example from additional CPE or from additional environmental noise sources. Each successive line is trained to achieve the highest number of bits per frequency or tone that can be sustained while maintaining acceptable signal margin. That is, each line is trained to its highest sustainable bit error rate (BER) under the circumstances that are extant during the training process.

After the last line card in a channel bank is installed and trained, the first-installed card experiences more noise than was extant when the first card trained up. There are commonly 75 to 80 line cards to a channel bank, and each line card typically is coupled to support one to four lines. The result is that first-trained lines may find it difficult to communicate, using the parameters that were set during their respective training processes, without incurring symbol errors.

The term symbol has a very specific meaning in an ADSL context. For example, if one is using 100 tone pairs, each of which is carrying 10 bits. 1000 bits are distributed among the 100 tone pairs to comprise a symbol that is sent for a symbol period. 1000 bits are being transmitted in the symbol.

One solution has been to effect a "reinstallation" process after all line cards are installed and trained. In carrying out such a process, an installer physically pulls out each line card and restarts each line card to allow the coupled lines to retrain. This process can take up to one minute per line card so that the entire "reprogramming" process can take more than an hour.

There is a need for a method for allocating operating frequencies to communication loops that provides an allowance for noise that will exist when all lines for a system are installed.

SUMMARY OF THE INVENTION

In a communication distribution network, whether the communications involve data or voice or both types of communication, the distribution loop to a customer is commonly terminated at the network side at a channel bank. A channel bank is a device that houses an array of line drivers, or line cards, that provide communication signals to customer communication loops. Usually there is one line card, or line driver, per loop. The end of the loop distal from the line cards/channel bank are terminated in customer terminal equipment such as telephone instruments, personal computer modems, facsimile machines or other communication terminal equipment.

The various customers serviced by a channel bank and connected by communication loops expect to receive certain downstream (i.e., from the channel bank to the customer terminal equipment) and certain upstream (i.e., from customer terminal equipment to the channel bank) data rates with low error rates. The various physical or geographic locations of individual customers result in the various communication loops being of various lengths and being subjected to various sources of electromagnetic noise that may interfere with acceptable transmission of data.

Conventionally, until now, assignment of tones to respective lines for effecting communication has been carried out in a serial fashion without regard to the impact upon the increasingly noisy environment that will be experienced by a given line as more lines are brought into operation. The increased noise will principally be caused by increased cross talk among lines as lines are added, but may include other noise sources, such as radio frequency (RF) noise, thermal (kTB) noise or other electromagnetic disturbances.

A method for training a plurality of line drivers in a communication system; each respective line driver being coupled with at least one communication line at a connection locus; each communication line being configured for communicating with subscriber equipment at a subscriber locus distal from the connection locus using at least one selected communication tone-set; the method includes the steps of: (a) selecting a test line driver from the plurality of line drivers; (b) selecting a first communication line coupled with the test line driver as a test line; (c) establishing synchrony with the subscriber equipment on the test line; (d) applying a test signal to the test line using a selected communication tone-set; (e) determining noise experienced on the test line using the test signal; (f) effecting evaluation of quality of the test line using the test signal; the quality being acceptable when the noise experienced on the test line plus a noise margin is within a predetermined value range; (g) when the quality is acceptable, designating the selected communication tone-set for operational employment by the test line; (h) repeating steps (b) through (g) until a set of communication lines coupled with the test line driver has been evaluated; and (i) repeating steps (a) through (h) until a set of line drivers of the plurality of line drivers has been evaluated.

It is an object of the present invention to provide a method for allocating operating tone-sets to communication loops that provides an allowance for noise that will exist when all lines for a system are installed.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
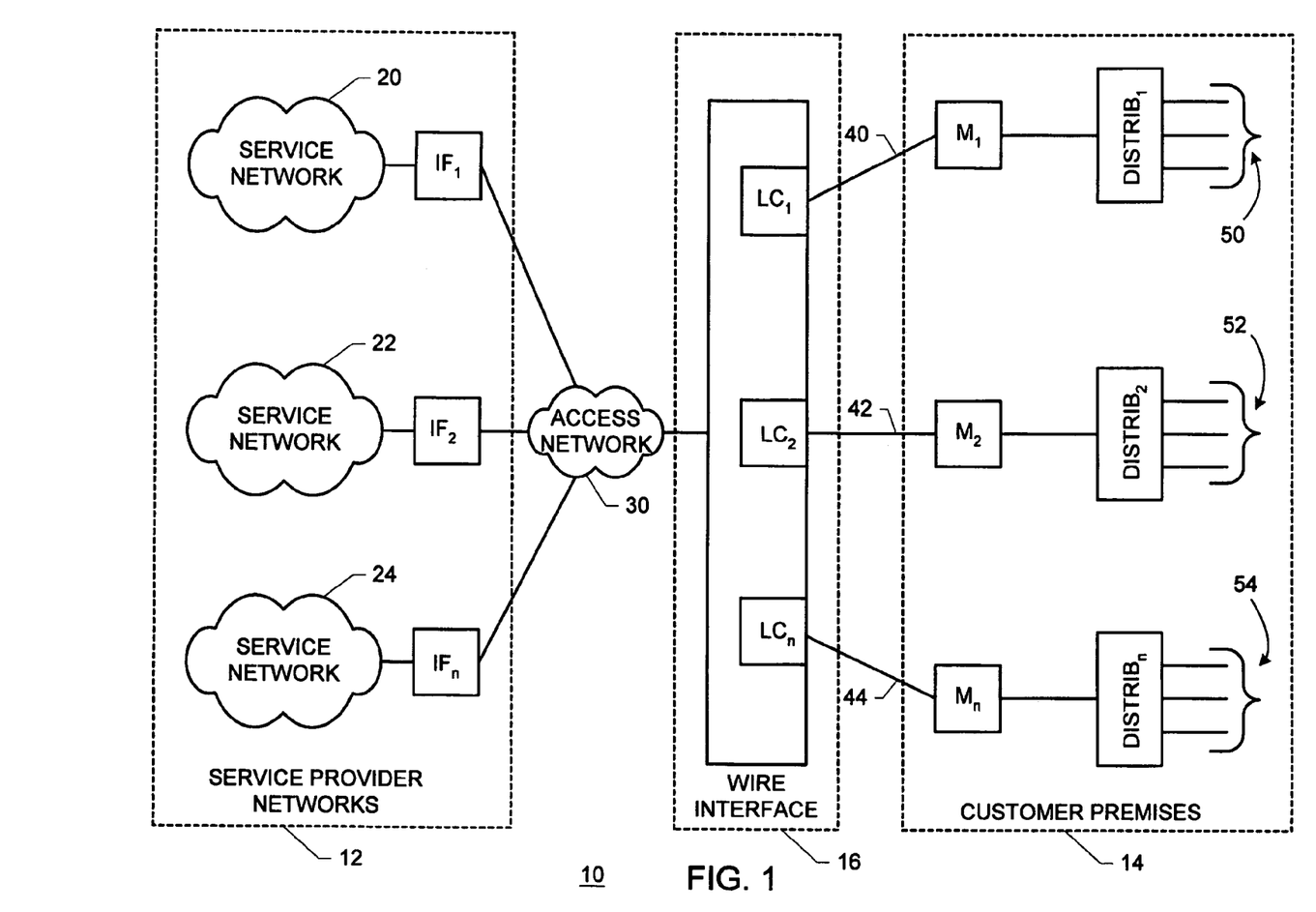
FIG. 1 is a schematic block diagram illustrating a wire interface device coupled for providing communication services to customer premises from a variety of communication networks.

FIG. 1 is a schematic block diagram illustrating a wire interface device coupled for providing communication services to customer premises from a variety of communication networks. In FIG. 1, a communication system 10 includes a service provider network sector 12 and a customer sector 14. A wire interface device 16 connects service provider network sector 12 with customer sector 14.

Service provider network sector 12 includes several service networks 20, 22, 24 and a like number of interface devices $IF_1$, $IF_2$, $IF_n$. The subscript notation "n" is employed here to indicate that there may be any number of service networks 20, 22, 24 and interface devices $IF_n$ within service provider network sector 12. Only three such service networks and associated interface devices are illustrated in FIG. 1 in order to simplify explaining the invention. Service networks 20, 22, 24 may include network service providers such as, by way of illustration and not by way of limitation, Internet service providers (ISP), frame relay services providers and other service providers.

Interface devices $IF_1$, $IF_2$, $IF_n$ are coupled with an access network 30. Access network 30 may be a wired network, an optical network, a wireless network, a "plain old telephone service" (POTS) network or any other communication network that conveys communication signals (including data communications or voice communications or both) from the various service networks 20, 22, 24 in service provider network sector 12. Access network 30 is coupled with wire interface device 16. Wire interface device 16 may be, by way of illustration and not by way of limitation, any interface device configured for receiving communication signals from access network 30 and conveying those communication signals in a wired connection to customer sector 14. The wired connection may be a coaxial cable, a twisted pair or another wired connection. Examples of wire interface devices include digital subscriber line access multiplexer (DSLAM) devices and channel banks. Wire interface device 16 includes line cards $LC_1$, $LC_2$, $LC_n$ for effecting connection with wired connectors 40, 42, 44. The subscript notation "n" is employed here to indicate that there may be any number of line cards $LC_1$, $LC_2$, $LC_n$ within wire interface device 16.

Customer sector 14 includes modem devices $M_1$, $M_2$, $M_n$. Line cards $LC_1$, $LC_2$, $LC_n$ are coupled with modem devices $M_1$, $M_2$, $M_n$ via wired connectors 40, 42, 44 for conveying communication signals from wire interface device 16 to customer sector 16. Each modem device $M_n$ is coupled with a respective distribution device $DISTRIB_1$, $DISTRIB_2$, $DISTRIB_n$. The subscript notation "n" is employed here to indicate that there may be any number of modem devices $M_1$, $M_2$, $M_n$ coupled with any number of distribution devices $DISTRIB_1$; $DISTRIB_2$, $DISTRIB_n$ within customer sector 14. Thus, in exemplary communication system 10 in FIG. 1 modem device $M_1$ is coupled with a distribution device $DISTRIB_1$, modem device $M_2$ is coupled with a distribution device $DISTRIB_2$ and modem device $M_n$ is coupled with a distribution device $DISTRIB_n$. Distribution device $DISTRIB_1$ provides communication signals via signal lines 50 to a variety of customer terminal equipment (not shown in FIG. 1) such as personal computers, telephone terminals, fax machines and other terminal equipment. Similarly, distribution device $DISTRIB_2$ provides communication signals via signal lines 52 to a variety of customer terminal equipment (not shown in FIG. 1), and distribution device $DISTRIB_n$ provides communication signals via signal lines 54 to a variety of customer terminal equipment (not shown in FIG. 1). Customer terminal equipment is also sometimes referred to as customer provided equipment (CPE). The term "CPE" may also refer to customer premises equipment.

Wired connectors 40, 42, 44 are commonly referred to as communication loops, or subscriber loops or simply as lines. FIG. 1 is a representative schematic diagram that does not illustrate communication system 10 in great detail. For example, a wire interface device 16, such as a DSLAM or channel bank, has a large number of line cards $LC_1$, $LC_2$, $LC_n$ for transceiving communications—data communications or voice communications or both—within communication system 10. Each line card $LC_1$, $LC_2$, $LC_n$ may have one line, two lines, four lines or another number of lines (represented by wired connectors 40, 42, 44 in FIG. 1) between a line card $LC_1$, $LC_2$, $LC_n$ and a connected modem device $M_1$, $M_2$, $M_n$.

An example of a communication system 10 that may advantageously employ the method of the present invention is an asymmetric digital subscriber line (ADSL) communication system. In an ADSL system, each communication loop or line has 255 tones available for coding information (i.e., communication signals) to be provided to or received from to customer sector 14. Signals are coded in communication tone-sets using quadrature amplitude modulation (QAM), a modulation technique that uses variations in signal vector values—amplitude and direction—to achieve data encoding symbols represented as any of 16 or 32 different states. QAM signals generally obey the relationship:

$$\text{Signal} = a_i \sin \omega t + b_j \cos \omega t \quad [1]$$

Where
 $\omega$ is the frequency of one of the 255 tones,
 t=time, and
 $a_i$, $b_j$ are constants.

Expression [1] is a very simplified schematic expression for defining QAM data points comprising communication tone-sets that is employed herein for illustrative purposes. A more detailed expression relating to QAM operations is:

$$S(t) = \sum_{i=1}^{255} a_{j,i} \cos(i\omega_o t) + b_{k,i} \sin(i\omega_o t) \quad [2]$$

Where $\omega_o$ is the base frequency. Data carried on the ith tone pair of the orthogonal sine and cosine functions I $\omega_o$ is imposed by varying the amplitude of the two functions—sine and cosine. The values of indices $j_{max}$ and $k_{max}$, and the scalar values of the amplitudes $a_{j,i}$ and $b_{k,i}$ associated with these indices, can and do vary with each tone pair.

Quadrature amplitude modulation (QAM) permits generation of data points in constellations. The magnitudes of constants $a_i$, $b_j$ determine the magnitude of a vector determining a data points, the signs of constants $a_i$, $b_j$ determine the quadrant occupied by the vector and the value ωt determines placement of the vector destination (i.e., direction of the vector) within a given quadrant for determining the data points. The greater the number of data points in a constellation, the greater must be the signal-to-noise ratio (SNR) of the communication system in order that intelligence-bearing signals may be distinguished from noise, and in order that the intelligence borne by the signals can be recovered. That is, there must be an adequate likelihood of discerning a proper data point from a noise signal. If there is more noise, there must be a greater separation among valid data points. Said another way, for a given bit error rate (BER), a denser constellation of data points is more sensitive to noise; a denser constellation requires a higher SNR to achieve a given BER.

The method of the present invention involves assignment of tone-sets among communication loops during initialization or training up of a communication system sector. The method is advantageously employed with QAM systems such as the ADSL system briefly described above.

Moreover, the method is useful with any communication system, whatever the modulation technique that is employed by the communication system. Thus, for example, the method may be used with systems employing frequency modulation (FM) of a carrier signal, systems employing amplitude modulation (AM) of a carrier signal and communication systems employing other types of modulation.

Training a communication system is a process that is effected when starting up a communication system, as at initial start-up or at start-up following an outage or a maintenance hiatus. Training is disruptive of normal operational employment of a communication loop and is therefore not usually carried out except during such down times. Training takes advantage of a feature of some modems to adjust to extant conditions including, for example, such conditions as amplitude response, delay distortions, timing recovery and echo characteristics of a particular communication loop. The technique of training, or training up as it is sometimes called, adjusts modems to current communication conditions.

Training may involve a transmitting line card at a wire interface device 16 (FIG. 1; in a telephone system central office, for example) sending a special training sequence of coded characters to a receiving modem device $M_1$, $M_2$, $M_n$ at customer premises in a customer sector 14 (FIG. 1). The receiving modem device $M_1$, $M_2$, $M_n$, adjusts to the line conditions experienced during training up.

Training for line drivers, or line cards, is also useful, and is usually carried out while training modems. Training for line cards involves establishing synchrony with customer provided equipment (CPE) at the distal end of the communication loop and then applying an algorithm (i.e., a special sequence of coded characters) to the line to achieve maximum data rate under the extant line conditions.

Continuing with the example of an ADSL communication system with QAM modulation, not all 255 tones available to each line must necessarily be used. Tones that yield too low a signal-to-noise ratio (SNR) may go unused. Another remedy for a too-low SNR may be to assign fewer bits to a particular tone. This may be accomplished by establishing fewer data points in a constellation, such as by providing greater dispersion of data points within a constellation. The term "tone", as used in this ADSL example, refers to a signal described in Expression [1] above and involves selecting a frequency ω and selecting coefficients $a_i$, $b_j$ to employ in Expression [1] that are appropriate for the extant line conditions. Such choices and decisions are part of the training process. It is in making decisions regarding choice of operating tone-sets to be used on a line for conveying information that the method of the present invention is useful. Thus, the method of the present invention is useful in choosing frequency ω for fashioning tones in an ADSL system, as well as being useful in selecting operating frequencies in communication systems using other modulation techniques.

There are several considerations that must be accommodated in making decisions regarding tone-set distribution among communication loops in a communication system. By way of illustration, some of those considerations that apply in the context of an ADSL communication system include:

Power spectral density (PSD) should be substantially equal across all 255 tones in a line. PSD involves the density of data points in a constellation and is related to frequency ω and to coefficients $a_i$, $b_j$ in Expression [1] above.

Once an ADSL line trains up, it preferably does not decrease its data rate without undergoing another entire retraining sequence. A retraining sequence may take on the order of 15-17 seconds. Such a hiatus in operation of an ADSL line is regarded as "breaking synch". Breaking synch is a condition that is obvious and disruptive to customers on the line involved; it is a very undesirable condition.

As one adds line cards to a channel bank or DSLAM, the power level preferably remains substantially the same and the data rate must remain substantially unchanged for all line cards. A usual consequence of adding line cards is a degradation of SNR; the SNR decreases. Power level is not usually the primary parameter for change. Parameters are preferably "managed" using the following priority: (1) achieve a desired noise margin (i.e., SNR) on the line; (2) set a data rate on a line; (3) lower power, if possible, to conserve energy. There are usually some measures of safety margins employed in setting each of the parameters; some inefficiency in operation is tolerated in order to avoid an undesired operational hiatus.

Industry standards must be met. For example, standards relating to ADSL systems establish that tones are to be integral multiples of 4.3125 kHz. Tones at frequencies above approximately 138 kHz are reserved for downstream (central office to customer) communications. Tones below approximately 138 kHz are reserved for upstream (customer to central office) communications.

Noise sources in communication systems are numerous and varied. Noise sources include, for example, environmental noise, appliances or other equipment operating at the customer's premises or at the central office, cross talk between lines and other sources. Cross talk is a phenomenon that occurs most readily between lines that are in close physical proximity operating at similar frequencies, especially high frequencies.

Figure 2:
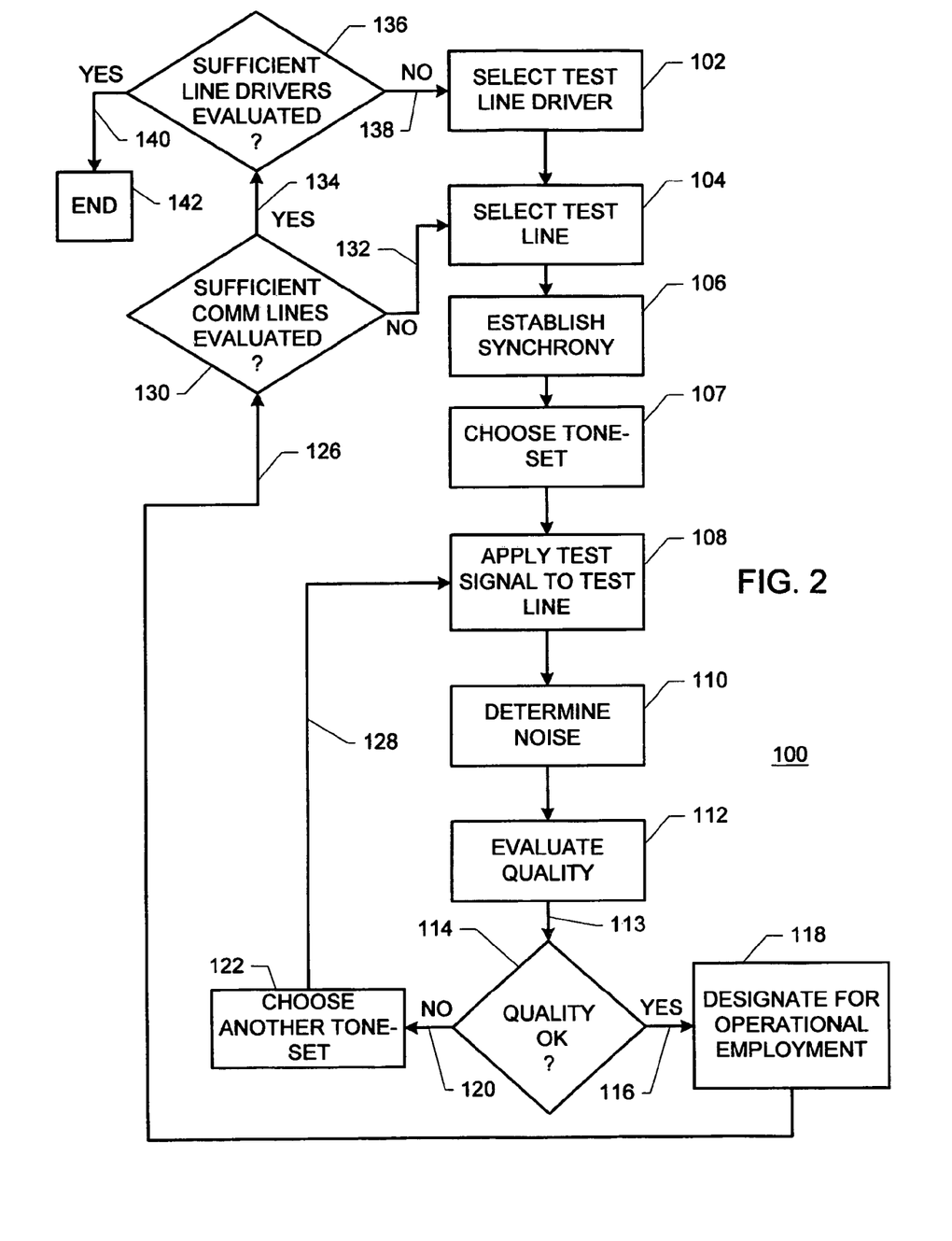
FIG. 2 is a flow diagram illustrating the preferred embodiment of the method of the invention.

FIG. 2 is a flow diagram illustrating the preferred embodiment of the method of the invention. In FIG. 2, a method 100 for training a plurality of line drivers in a communication system is illustrated. In the communications in which method 100 is employed, each respective line driver of the plurality of line drivers is coupled with at least one respective communication line at at least one respective connection locus. Each at least one respective communication line is configured for communicating with respective subscriber equipment at a respective subscriber locus distal from the respective connection locus using at least one selected communication tone-set of a plurality of communication tone-sets. Method 100 begins with the step of selecting a test line driver from the plurality of line drivers, as indicated by a block 102.

Method 100 continues by selecting a first respective communication line coupled with the test line driver as a test line, as indicated by a block 104. Method 100 continues by establishing synchrony with the respective subscriber equipment on the test line, as indicated by a block 106. Method 100 continues by choosing a respective at least one selected communication tone-set of the plurality of communication tone-sets, as indicated by a block 107. Method 100 continues by applying a test signal to the test line, as indicated by a block 108. The test signal uses the respective selected communication tone-set chosen pursuant to the step represented by block 107. Method 100 continues by determining noise experienced on the test line using the test signal, as indicated by a block 110. Method 100 continues by effecting evaluation of quality of the test line using the test signal, as indicated by a block 112. The quality of the test line using the test signal is acceptable when the noise experienced on the test line plus a noise margin is within a predetermined value range. The testing for quality by method 100 is indicated by a query block 114 and is linked with block 112 by a branch line 113. If quality of the test line using the test signal is not acceptable, method 100 proceeds via "NO" response line 120 from query block 114 and chooses another respective at least one selected communication tone-set, as indicated by block 122. Method 100 proceeds from block 122 via feedback line 128 to block 108 to effect applying a test signal to the test line again using the newly selected respective communication tone-set. Noise on the test line is determined using the test signal (block 110) and quality of the test line using the test signal is evaluated (block 112). The query posed by query block 114 again requires answering.

If quality of the test line using the test signal is acceptable, method 100 proceeds from query block 114 via YES response line 116 and the selected communication tone-set is designated for operational employment by the test line, as indicated by a block 118. Method 100 proceeds from block 118 via line 126 to a query block 130 by which the query is posed, "Have sufficient communication lines been evaluated?". Query block 130 inquires whether the test line driver being currently evaluated has had sufficient of its coupled and supported communication lines trained to support its intended operations. If insufficient communication lines have been trained for the presently evaluated test line driver, method 100 proceeds via NO response line 132, and method steps represented by blocks 104, 106, 107, 108, 110, 112, 114, 118 are repeated for evaluating noise on test lines coupled with the test line driver. If sufficient communication lines have been trained for the presently evaluated test line driver, method 100 proceeds via YES response line 134 to a query block 136.

Query block 136 inquires whether the channel bank being currently evaluated has had sufficient of its line drivers trained to support its intended operations. If insufficient line drivers have been trained for the presently evaluated channel bank, method 100 proceeds via NO response line 138, and steps represented by blocks 102, 104, 106, 108, 110, 112, 114 are repeated for evaluating noise on test line drivers in the channel bank. If sufficient line drivers have been trained for the presently evaluated channel bank, method 100 proceeds via YES response line 140 to terminate at an end locus 142.

A simplified example in an ADSL system illustrates the operation of the invention. At the outset no lines are installed in the channel bank and the system software is "aware" of that configuration. As a matter of design choice, a 0 dB noise margin is established when the data stream experiences a $1 \times 10^{-7}$ bit error rate (BER). A frequently provided (design objective) noise margin sought in a line card is a 6 dB noise margin. That is, the system is provided with each line is trained to convey a data stream with a signal-to-noise ratio (SNR) at a level such that if the SNR dropped by 6 dB, the data BER would be $1 \times 10^{-7}$. In practicing the present invention in the simplified example presented here, when the first line is installed and trained the noise margin trained to is a 9 dB margin. Providing for such a relatively large noise margin anticipates that as additional lines are installed and trained up there will be additional undesirable cross talk among the various lines and the noise margin of the first line will drop to around 6 dB after the additional lines are installed and trained up. Accordingly, the second line installed may be trained, for example, to a noise margin on 8.5 dB, and at the same time the first line may be effectively retrained to a noise margin of 8.8 dB. The effective retraining of the first line should have no appreciable negative effect on operation of the system; if the first line is actually retrained for some reason, it will retrain to the new target noise margin: 8.8 dB. The method is iteratively practiced until all lines are installed and trained, and the target noise margin for all lines will asymptotically approach 6 dB. The method is easily implemented and requires no test signals or measurement reductions.

One exemplary embodiment of the invention contemplates providing a noise margin (block 112) for each respective line as it trains up. The size of the noise margin may preferably be determined based upon the number of lines currently installed. Alternatively, the size of the noise margin may be determined based upon the number of lines expected (or designed to be) installed.

Such an estimation of noise margin required to anticipate expected noise in the completed system lowers error rates during operation and is an improvement to the prior art serial installation sequence which is a sort of "you take what you get" approach. An exemplary method for carrying out this first embodiment may compute an extra amount of noise margin for each line to be installed prior to training. The extra noise factor may, by way of example, be calculated according to an exponentially decaying function of the number of lines already trained. For example, $$\text{Extra Noise Margin} = 3 \cdot 10^{\left(\frac{-n}{112}\right)} dB \qquad [3]$$

Where $n$ = number of lines already trained up

As mentioned above, n may in the alternative represent the number of lines expected to be (or designed to be) trained up.

In this first embodiment, some amount of noise margin will likely be "wasted" in a less than fully populated line card environment. That is, the first few lines may train up with a greater noise margin than is desired by a customer. If no further lines are installed, the extra amount of noise margin added is not compensated by real noise. Such an arrangement would not be likely to adversely affect a customer's service.

A second exemplary embodiment of the invention contemplates providing a dynamically determined noise margin (block 112). According to this second exemplary embodiment, whenever the noise margin (determined, for example, by Expression [3]) degrades below a predetermined threshold value "X" for a predetermined period of "Y" seconds, for a given line, then the affected line is retrained. Preferably, the values for "X" and "Y" are stored in a table on-line.

This second embodiment is a dynamic method for training that may be employed during installation or during operation; If employed during operation, there would necessarily be other criteria that must be met before a retraining operation is commenced because of the restraints placed on system operation by industry standards applying to communication systems, such as ADSL systems. An exemplary implementation of this second embodiment may provide that the noise margin reported by each line be compared to the X values in a table. For each X value a running count may be kept of the number of consecutive seconds Y (or number of consecutive queries) for which the noise margin is below X. When the running count for any X value exceeds its corresponding Y value, the line may be forced to retrain. Preferably the corresponding X,Y values are monotonically related so that badly degraded lines (i.e., lines far below an X value) are forced to retrain with little delay. In such an arrangement, slightly degraded lines may be timed for a longer duration (Y value) before being forced to retrain.

If this second embodiment is used during operation (as opposed to using the embodiment only during installation), retraining of lines will temporarily interrupt the customer's service. However, if the X values and Y values are properly selected such interruptions may be experienced under conditions when a customer's service is effectively interrupted or about to be interrupted anyway because the noise margin has degraded to a sufficiently unacceptable level to cause symbol errors.

A third exemplary embodiment of the invention contemplates combining embodiments one and two so that there is a system approach to line training during installation as well as during operation. Such a third embodiment may, for example, provide that the first embodiment described above be employed during installation or on start up after maintenance operations have interrupted normal operational employment of a communication system. After the system is restored to operation, the second embodiment described above may be employed to force retraining when the system is effectively interrupted or about to be interrupted by developing conditions.

Figure 3:
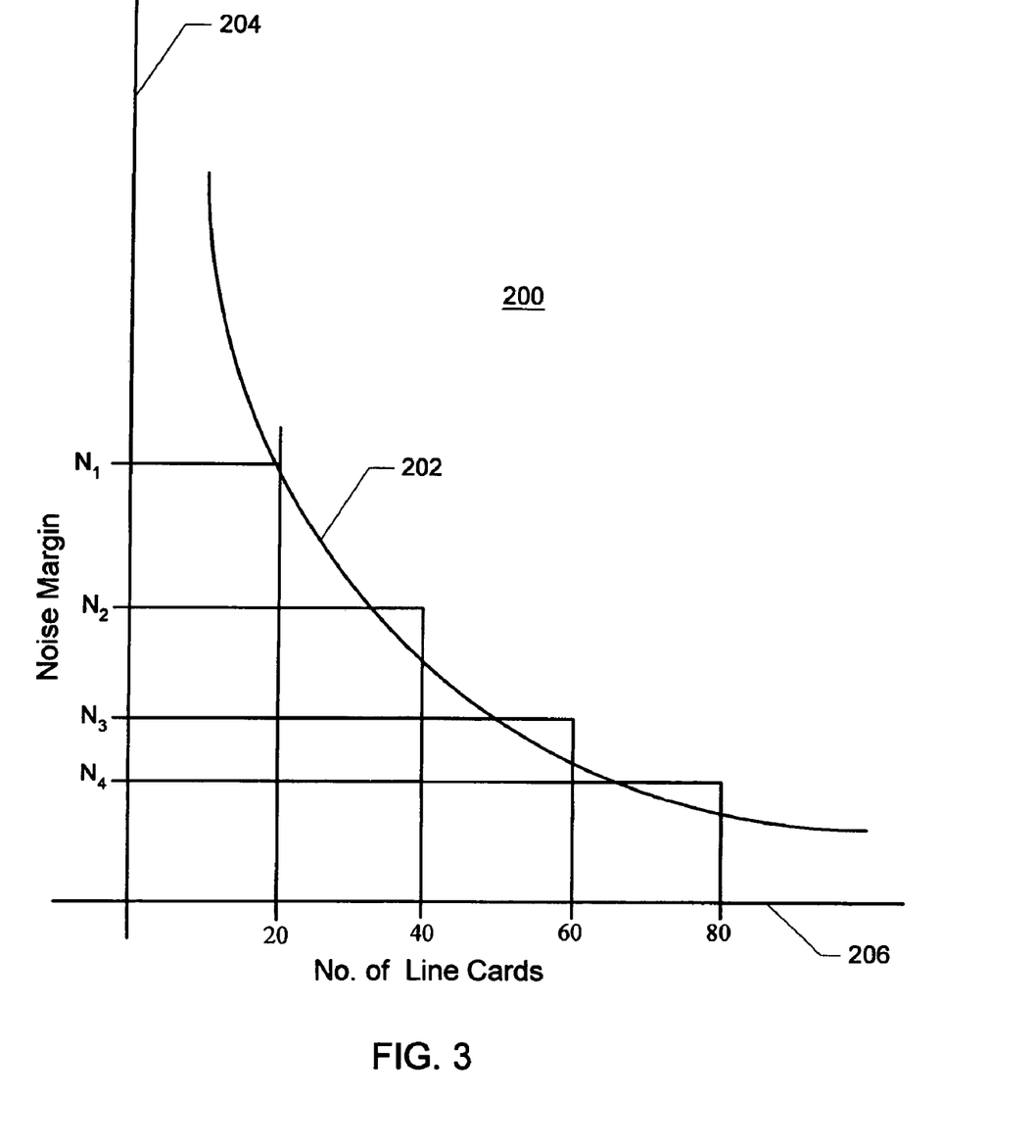
FIG. 3 is a graphic representation of an alternate implementation of the preferred embodiment of the present invention.

FIG. 3 is a graphic representation of an alternate implementation of the preferred embodiment of the present invention. The first embodiment of the invention may be implemented by applying an extra noise margin in blocks. That is, rather than have an individual noise margin for each of the lines, assign a noise margin of a first magnitude for a first n lines trained. Assign a somewhat lesser extra noise margin for the next n lines trained. The n values need not be constant, nor do incremental values for noise margin need to be constant. In FIG. 3, a graphic plot 200 includes a curve 202 plotted with respect to an axis 204 representing noise margin and with respect to an axis 206 representing number of line cards. Thus, curve 202 is a representation of the noise margin for a system as a function of the number of line cards. Curve 202 is not linear; the noise margin function represented by curve 202 varies a different amount for a given incremental number of line cards. For example, a noise margin value $N_1$ may be employed in practicing the method of the invention for up to 20 line cards. Between 20 line cards and 40 line cards, a noise margin value $N_2$ may be employed in practicing the method of the invention. From 40 line cards to 60 line cards, a noise margin value $N_3$ may be employed in practicing the method of the invention. From 60 line cards to 80 line cards, a noise margin value $N_4$ may be employed in practicing the method of the invention.

The differences among the various noise margin values $N_1$, $N_2$, $N_3$, $N_4$ are not constant. Thus, $|N_1-N_2|$ is not required to be equal with $|N_2-N_3|$. $|N_2-N_3|$ is not required to be equal with $|N_3-N_4|$. $|N_3-N_4|$ is not required to be equal with $|N_4|$.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for training a line driver in a communication system; said line driver being coupled with a communication line at a connection locus; said communication line being configured for communicating with subscriber equipment at a subscriber locus distal from said connection locus using at least one selected communication tone-set of a plurality of communication tone-sets; the method comprising the steps of:

determining a first noise value expected to be experienced on said communication line for present communications, wherein the first noise value is due at least in part to operations of other communication lines terminated in said connection locus;

determining a second noise value expected to be experienced on said communication line from other communication lines subsequently terminated at said connection locus;

evaluating quality of said communication line considering both the first noise value and the second noise value; said quality of said communication line being acceptable when the first noise value and the second noise value are collectively within a predetermined value range.

2. The method of claim 1 wherein said second noise value is predetermined based upon the number of communication lines which can be supported by the communication locus.

3. The method of claim 1 further including assigning at least one tone-set to said communication line based on said step of evaluating.

4. The method of claim 1 wherein said second noise value is simulated from cross-talk noise expected to be experienced from addition communication lines supported by said communication locus.

5. The method of claim 1 wherein said steps of determining a first noise value, determining a second noise value, and evaluation quality are repeated for said plurality of tone-sets until an acceptable determination is made for a selected tone-set.

6. A method for training a line driver in a communication system; said line driver being coupled with at least one respective communication line at least one respective connection locus; each said at least one respective communication line being configured for communicating with respective subscriber equipment at a respective subscriber locus distal from said respective connection locus using at least one selected communication tone-set of a plurality of communication tone-sets; the method comprising the steps of:

a. selecting a first said respective communication line coupled with said line driver as a test line;

b. choosing a respective said at least one selected communication tone-set;

c. determining noise experienced on said test line; and d. effecting evaluation of quality of said test line; said quality of said test line being acceptable when said noise experienced on said test line plus a noise margin is within a predetermined value range.

7. The method of claim 6 further including the steps of:

e. when said quality is not acceptable, selecting another said selected communication tone-set and repeating steps (b) through (d); and f. when said quality is acceptable, designating said respective at least one selected communication tone-set for operational employment by said test line.

8. The method of claim 7 further including repeating steps (a) through (f) until a set of communication lines of said at least one respective communication line coupled with said test line driver has been evaluated.

9. The method of claim 6 wherein said noise margin corresponds to noise expected to be experienced from other communication lines terminated at said connection locus subsequent to the training of a driver.

10. The method of claim 6 wherein said noise margin is predetermined based upon the number of communication lines expected to be terminated at said connection locus.

11. The method of claim 6 wherein said noise margin is dynamically determined for each iteration of method step (d).

12. The method of claim 6 wherein method steps are implemented via software.

13. The method of claim 6 wherein the noise margin is simulated via software.

* * * * *

UNITED STATES PATENT AND TRADEMARK OFFICE
CERTIFICATE OF CORRECTION

PATENT NO. : 7,593,511 B2
APPLICATION NO. : 11/365386
DATED : September 22, 2009
INVENTOR(S) : Ronald Bentley Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Twenty-first Day of September, 2010

David J. Kappos
*Director of the United States Patent and Trademark Office*